(No Model.)
D. F. LAUGHLIN & C. F. LESLIE.
HAY STACK BINDER.
No. 369,251. Patented Aug. 30, 1887.
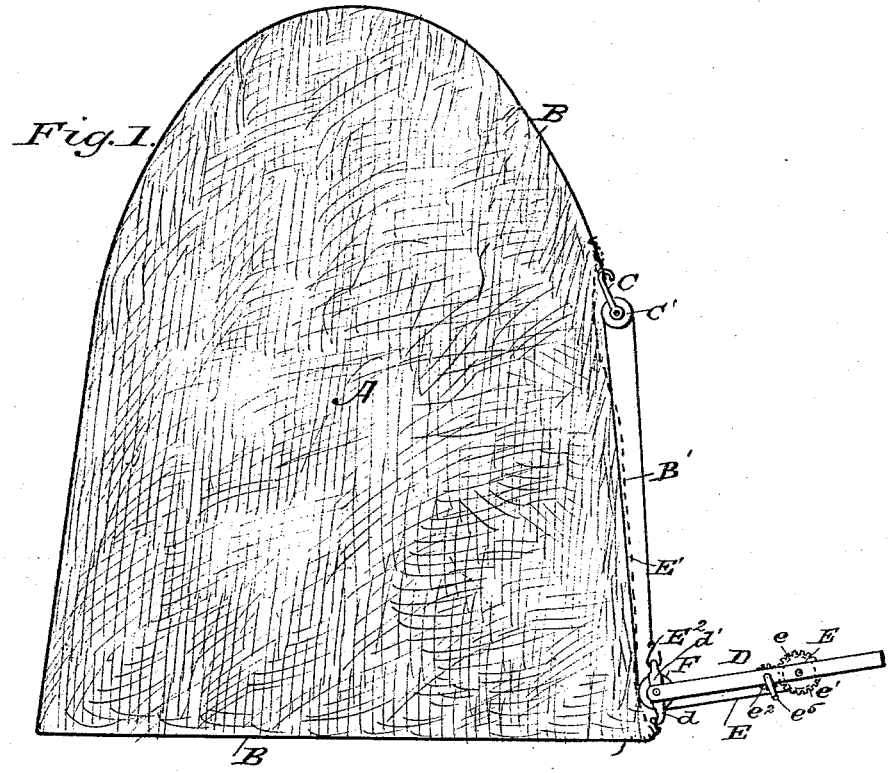
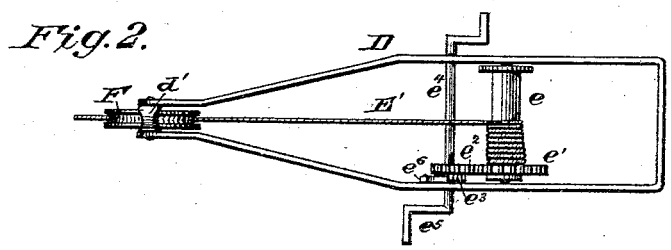
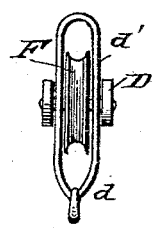
Witnesses
Fred G. Dieterich
Inventor
D. F. Laughlin
C. F. Leslie
By Munn & Co.
Attorneys

UNITED STATES PATENT OFFICE.

DAVID F. LAUGHLIN AND CHARLES F. LESLIE, OF CLYDE, KANSAS.

HAY-STACK BINDER.

SPECIFICATION forming part of Letters Patent No. 369,251, dated August 30, 1887.

Application filed June 11, 1887. Serial No. 241,086. (No model.)

*To all whom it may concern:*

Be it known that we, DAVID F. LAUGHLIN and CHARLES F. LESLIE, of Clyde, in the county of Cloud and State of Kansas, have invented a new and useful Improvement in Hay-Stack Binders, of which the following is a specification.

Our invention is especially designed for use in binding hay-stacks, wherein a suitable number of cords or wires are placed around the stack and bound together at their ends to tightly hold or bind the stack and prevent the hay from being scattered and blown away by high winds or cyclones; and the invention consists, generally, in a frame carrying two hooks, to one of which the binding-wire is attached, a sheave-pulley located at one end, and a windlass at the other end of said frame carrying a rope which passes over said sheave-pulley, and thence over a sheave-pulley attached by a hook to the other end of said binding-wire, and then carried back and secured to the remaining hook upon the end of the frame, as will hereinafter appear.

In the accompanying drawings, Figure 1 is an end elevation showing our device as applied to a hay-stack. Fig. 2 is an enlarged plan of our improved cord-tightening device detached; Fig. 3, an end elevation of the device shown by detail in Fig. 2.

The stack A is laid or built upon a number of wires, B, one end of which is carried over the top of the rick and down to within convenient reach of the ground upon the opposite side of said stack, and is secured firmly to a hook, C, carrying a sheave-pulley, C'. The other end of the wire B is then secured to a hook, $d$, upon the end of a frame, D. The frame D carries a windlass, E, composed of a roller, $e$, cog-wheel $e'$ on the axle of said roller, a cog-pinion, $e^2$, and ratchet-wheel $e^3$ upon a shaft, $e^4$, supported in bearings in the frame D, and provided with a crank-handle, $e^5$, and a pawl, $e^6$, pivoted to the frame to engage with the said ratchet-wheel. A rope, E', is secured to and wound upon the roller $e$ and passes around a sheave-pulley, F, supported to turn freely in loop $d'$, formed integral with the hook $d$ upon the end of the frame E, and said ropes pass from the sheave-pulley F around the sheave-pulley C', and are then carried down and secured by a hook, E², upon the end of the rope E', which engages with the loop $d'$, within which the pulley F is supported. By turning the handles of the windlass the rope E' is wound upon the roller $e$ and draws the sheave-pulley C' downwardly toward the pulley F. The ends of the wire B are thus drawn together and may be secured in any well-known or preferred manner. We prefer, however, to unite the ends of the wire B, after they are drawn together, by a tie-wire, B', as shown by dotted lines in Fig. 1.

The device herein described is especially designed for binding large masses—such as stacks or ricks of hay, fodder, or straw—wherein the length of the line encompassing the stack is greatly shortened by the compression of the bundle, and will provide a simple, cheap, and efficient device for this purpose.

We are aware that cord-tightening devices and winding or hoisting devices have been employed upon stump-extractors and for similar purposes, and do not broadly claim such device, as our invention is especially adapted for light work, to be conveniently carried around, and to be readily attached to the binding cords or wires and rapidly take up the slack and hold the wires until they are securely tied or united at their ends.

We claim as our invention and desire to secure by Letters Patent—

The combination, with the frame D, formed of a single piece having converging forward ends, a loop, $d'$, and hook $d$, made integral and secured to the said converging ends crosswise the same, of the pulley F, supported within the loop $d'$, a windlass, E, supported within the frame, and rope E' and hook-pulley C', combined to operate for tightening a binding-wire, substantially as described.

DAVID F. LAUGHLIN.
CHARLES F. LESLIE.

Witnesses:
T. J. CAMPBELL,
P. MCDONALD.